Figure 1:
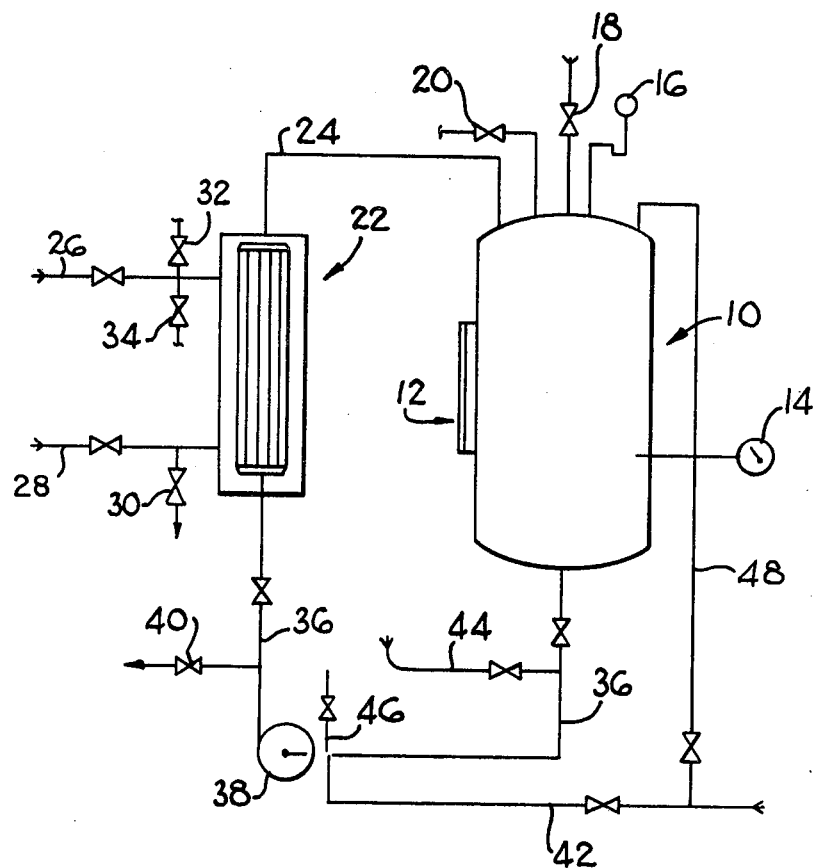

United States Patent [19]

Job et al.

[11] 4,330,667
[45] May 18, 1982

[54] RESINOUS POLYMERIC SUBSTANCES

[75] Inventors: John L. Job, Pinetown; Peter S. Shaw, Randburg, both of South Africa

[73] Assignee: National Chemical Products Limited, Johannesburg, South Africa

[21] Appl. No.: 18,555

[22] Filed: Mar. 8, 1979

[30] Foreign Application Priority Data

Mar. 13, 1978 [ZA] South Africa .................. 79/1454

[51] Int. Cl.³ ............................................. C08G 12/06
[52] U.S. Cl. ......................................... 528/266; 75/2; 209/166; 528/228; 528/229; 528/269
[58] Field of Search ............... 528/228, 229, 266, 269, 528/246; 209/166

[56] References Cited

U.S. PATENT DOCUMENTS

| | | | |
|---|---|---|---|
| 3,461,100 | 8/1969 | Payne et al. | 528/229 |
| 3,493,522 | 2/1970 | Webb | 528/229 |
| 3,503,739 | 3/1970 | Dubosc et al. | 528/266 |
| 3,506,613 | 4/1970 | Bayer | 528/229 |
| 3,965,070 | 6/1976 | Wuchter | 528/266 |

FOREIGN PATENT DOCUMENTS

| | | |
|---|---|---|
| 478948 | 7/1929 | Fed. Rep. of Germany . |
| 912864 | 6/1954 | Fed. Rep. of Germany . |
| 717412 | 3/1951 | United Kingdom . |

*Primary Examiner*—Lucille M. Phynes
*Attorney, Agent, or Firm*—Ladas & Parry

[57] ABSTRACT

A resinous polymeric substance for use as an aid in froth flotation characterized by its mean molecular weight, elemental analysis, viscosity and infra-red spectrum. A method of making the substance by reacting a carbonyl compound with an amine or ammonia followed by heating; and a method of froth flotation in which the substance is used as an aid. The substance has a mean molecular weight in the range 250–10 000; it includes carbon, hydrogen, nitrogen and oxygen; it has a viscosity of 10 000 to 100 000 centipoise at 20° C. and 100 to 1 000 centipoise at 70° C.; and it has an infra-red spectrum including bands characteristic of the groups $-C=N-$, $>N-H$ and $>C=C<$.

35 Claims, 9 Drawing Figures

RESINOUS POLYMERIC SUBSTANCES

This invention relates to a group of resinous polymeric substances including substances useful in froth flotation, to a method of making such substances, and to a method of froth flotation employing such substances.

According to one aspect of the invention there is provided a group of resinous polymeric substances characterised in that the substances of the group:

(i) have mean molecular weights as determined ebulliometrically or by size-exclusion chromotography in the range 250–10,000;

(ii) include carbon (C), hydrogen (H), nitrogen (N), and oxygen (O), and have elemental analyses falling within the ranges:

| ELEMENT | % m/m (by mass) |
|---|---|
| C | 60–80 |
| H | 4–12 |
| N | 5–15 |
| O | 2–25 |

(iii) have viscosities falling within the range 10,000–100,000 centipoise (cps) at 20° C. and within the range 100–1,000 cps at 70° C.;

(iv) have infra red (IR) spectra including a broad weak band thought to be characteristic of the hydrogen-bonded imine group and a broad strong group of bands characteristic of the groups: -C$=$N-(isolated or conjugated with $>$C$=$$<$ or $>$C$=$N—); $>$N—H; and $>$C$=$C$<$ The resinous polymeric substances may be obtained by reacting carbonyl compounds with amines (including ammonia) followed by heating to a temperature above 50° C.

It is preferred that the mean molecular weights fall within the range of 250 to 2,500, and more preferably in the range 400 to 2,000.

The elemental analyses of the substances preferably fall within the ranges:

| ELEMENT | % m/m |
|---|---|
| C | 60–70 |
| H | 8–10 |
| N | 8–14 |
| O | 10–17 | and the preferred compounds in accordance with the invention have elemental analyses falling within the ranges:

| ELEMENT | % m/m |
|---|---|
| C | 62–67 |
| H | 9–10 |
| N | 11–13 |
| O | 12–14 |

The absorption bands referred to above are as obtained on a Beckman 'Acculab IV' infra-red spectrophotometer using chloroform as solvent, the solution in question having a concentration of the substance according to the invention of about 1%. The broad weak band thought to be characteristic of the hydrogen-bonded imine group, measured as described above, occurs in the wavenumber range 2600 cm$^{-1}$ to 2450 cm$^{-1}$; and the broad strong group of bands characteristic of the groups —C$=$N— (isolated or conjugated as described above), N—H and C$=$C, measured as described above, occurs in the wavenumber range 1700 cm$^{-1}$ to 1550 cm$^{-1}$. The IR spectra of the substances according to the invention may, typically, be substantially similar to the IR spectra shown in the drawings and described hereunder.

The resinous polymeric substances according to the invention are obtainable by reacting carbonyl compounds with amines (including ammonia) followed by autoclaving, in accordance with the method described hereunder.

According to another aspect of the invention there is provided a method of making a resinous polymeric substance as described above, which includes the steps of reacting one or more carbonyl compounds with one or more amines (including ammonia) followed by heating to a temperature above 50° C.

The amines (including ammonia) used as starting materials may be in accordance with the formula RNH$_2$ in which R is hydrogen or a linear or branched chain, saturated or unsaturated alkyl group having from 1 to 18 carbon atoms inclusive. When R is an alkyl group, it preferably has from 1 to 4 carbon atoms inclusive.

The carbonyl compounds used as starting materials may be aldehydes or ketones, and preferred starting materials are aldehydes in accordance with any one of the formulae (I) to (IV):

(I) R$_1$CHO where R$_1$ is a linear or branched alkyl group having from 1 to 4 carbon atoms;

where R$_2$ is H, CH$_3$—, CH$_3$CH$_2$—, CH$_3$CH$_2$CH$_2$— or (CH$_3$)$_2$CH—
and
R$_3$ is H, CH$_3$—, or CH$_3$CH$_2$—;

where R$_4$ is H, CH$_3$—, CH$_3$CH$_2$—, CH$_3$CH$_2$CH$_2$— or (CH$_3$)$_2$CH—
and R$_2$ and R$_3$ are as defined above; and

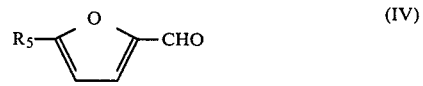

where R$_5$ is H or —CH$_2$OH.

Conveniently ammonia (NH$_3$) is used as the amine starting material (and "amine" in the specification is to be construed accordingly to cover ammonia), and the aldehyde starting material is selected from the group comprising acetaldehyde, butyraldehyde, 3-hydroxybutyraldehyde, acetaldol, crotonaldehyde, 3-ethoxybutyraldehyde, 3-methoxybutyraldehyde and furfural.

Broadly in accordance with the invention, two process paths may be used for applying the method of making the substances in accordance with the invention.

The first process path comprises mixing the carbonyl starting material with ammonia or amine starting material in a pressure reactor, optionally in the presence of a solvent, followed by autoclaving the reaction mixture to a temperature above 50° C. under pressure. The reaction mixture after autoclaving may then be degassed or evaporated under vacuum to yield the product resinous substance. Either starting material can be added to the other, provided that the starting material which is added to the other is added in a controlled fashion so that the reaction takes place at a controlled rate.

According to the second process path the carbonyl starting material is an aldehyde and the aldehyde is added in a controlled fashion to a solution of the ammonia or amine starting material in water, followed by isolation of the initial reaction product, preferably by crystallization, extraction with a suitable solvent or evaporation under reduced pressure at low temperatures. The isolated initial reaction product is then heated alone or in a solvent at atmospheric pressure or in an autoclave to yield the final product, the resinous polymeric substance according to the invention.

When following the first process path, mixing of the starting materials or reactants may be carried out with stirring and/or pumping and cooling, preferably in the presence of a suitable solvent. Conveniently the mole ratio of carbonyl compound to ammonia or amine is in the range 1:1 to 5:1. Autoclaving is then preferably carried out at a temperature in the range 100° C. to 250° C. for a period of ¼ hour to 10 hours. Degassing or evaporation may then be carried out at a pressure of between 15 mm Hg and 760 mm Hg, and at a temperature below 100° C.

According to the first process path an aldehyde is conveniently used, and is mixed with a suitable solvent such as ethanol in the reactor. Anhydrous ammonia is preferably used as the other starting material, and may be metered into the reactor, the reactor being stirred and cooled to maintain the temperature below 75° C., with the mole ratio of aldehyde to ammonia being in the range 1,5:1 to 3:1. After the ammonia has been added, the reaction mixture may then be autoclaved to a temperature in the range 120° C. to 180° C. for a period of ½ hour to 3 hours. Evaporation may then be carried out at a pressure between 30 mm Hg and 300 mm Hg and at a temperature in the range 35° C. to 65° C.

According to the second process path, the carbonyl starting material is preferably an aldehyde according to any one of formulae I, II or IV defined above, and the amine starting material is an aqueous ammonia solution, the heating being to a temperature above 75° C. The aldehyde is added to the aqueous ammonia solution, with stirring, and cooling if necessary, at a temperature within the range of −10° C. to 20° C., the mixture then being maintained within this temperature range for a period of between 1 and 15 days, preferably 1 to 10 days, after which the initial reaction product is isolated by crystallization, extraction with a suitable solvent or evaporation under reduced pressure at low temperatures. This initial product is then heated to a temperature within the range 100°–250° C. for a period in the range ¼ hour to 10 hours.

According to the second process path, the aldehyde may be selected from the group consisting in acetaldehyde, butyraldehyde, 3-ethoxybutyraldehyde and 3-methoxybutyraldehyde. The aqueous ammonia is conveniently commercial ammonia liquor and the temperature at which the aldehyde is added to the liquor is conveniently in the range −5° C. to 5° C., the mixture being stirred at a temperature in the range of 0° C.–5° C. for a period of about 8 days. The initial reaction product, after isolation, is conveniently heated to a temperature in the range 120° C. to 180° C., for a period ½ hour to 3 hours.

Although reference has been made above to a group of substances generally suitable for use in froth flotation and to methods of making such substances, it will be appreciated that the invention extends also to mixtures of such substances, and to methods, in accordance with the invention, of making such mixtures. Thus, the starting materials may comprise a mixture of carbonyl compounds on the one hand and a mixture of amines (including ammonia) on the other. The product may thus be a mixture of the substances in accordance with the invention. The invention thus extends to a method of making such mixture, to such mixture when made in accordance with the method above and to such mixture when capable of being made in accordance with the described method.

The substances in accordance with the invention are resinous polymers, and making these substances will now be described, with reference to the following non-limiting examples.

EXAMPLE 1

On a laboratory scale 15 g of 3-ethoxybutyraldehyde was dissolved in 120 ml of ethanol to which was added, with mixing, 14 ml of a 30% aqueous solution of methylamine. The mixture was placed in a 250 ml stainless steel pressure reactor and heated to a temperature between 110° C. and 120° C. for a period of 1½ hours. A resinous polymeric substance in accordance with the invention was obtained.

EXAMPLE 2

5 g of 3-ethoxybutyraldehyde and 100 g of diisopropylether solvent were mixed in a 250 ml stainless steel pressure reactor and 1.1 ml of liquid anhydrous ammonia was added under pressure. The reactor was heated at 140° C. for 1¾ hours and 0.5 ml of a resinous polymeric substance in accordance with the invention was recovered.

EXAMPLE 3

The procedure of Example 2 was repeated using 10 g of 3-ethoxybutyraldehyde instead of 5 g thereof, and using 2.2 ml of the ammonia instead of 1.1 ml. A resinous polymeric substance in accordance with the invention was obtained.

EXAMPLE 4

300 ml of 3-methoxybutyraldehyde was mixed with 300 ml of 95% ethanol in a 1 liter Parr pressure reactor fitted with a gas sparger, cooling coil and agitator. 54 ml of anhydrous ammonia was added without cooling and under pressure, and the reactor was heated to within the temperature range 140° C.–150° C. for a period of 2 hours. After cooling, the product was stripped on a rotary vacuum evaporator and a resinous polymeric substance in accordance with the invention was obtained.

EXAMPLE 5

The procedure of Example 4 was repeated, using 200 ml of ethanol as solvent, 400 ml of acetaldehyde and 60 ml of liquid anhydrous ammonia, the temperature of the mixture rising to 75° C. The reactor was then heated at 140° C. for 1½ hours to obtain a resinous polymeric substance in accordance with the invention.

EXAMPLE 6

25.22 g of 3-ethoxybutyraldehyde was added dropwise with stirring to 75 ml of a 27% aqueous solution of ammonia which was cooled to maintain it at 5° C., and the solution was stored in a domestic refrigerator for 15 days. The solution was extracted with 3×50 ml ether, the ether extract dried ($Na_2SO_4$) and evaporated, yielding 18.95 g. Further extracts produced another 6% yield. 4.68 g of the yield was heated slowly in a test tube to 140° C. over 4½ hours with evolution of ammonia above 75° C., and the temperature maintained at 140° C. for a further 1 hour. 3.48 g of resinous polymeric substance in accordance with the invention was obtained.

EXAMPLE 7

200 g of acetaldehyde was added to 1.5 l of 27% aqueous ammonia solution and the solution was refrigerated for 14 days. Large prismatic crystals, formed from the refrigerated solution, were filtered off, crushed and dried in a vacuum for 2 days. The product comprised 94.7 g. 5 g of the product was heated slowly to decomposition (105° C.–110° C.) with ammonia evolution, and was then heated to 140° C. for 1 hour, yielding 1.59 g of a resinous polymeric substance in accordance with the invention.

EXAMPLE 8

25 g of butyraldehyde was added to 121 ml of 27% aqueous ammonia solution according to the procedure of Example 6, and the solution was refrigerated for 13 days. The reaction mixture was found to have an oily upper layer which slowly crystallized. After filtering, the mother liquor was extracted with 4×40 ml ether, yielding a further 1.95 g oil. The crystals obtained decomposed with effervescence on drying in vacuum, yielding 8.68 g oil (35% yield). 1 g of the oil obtained from the crystals was heated to 75° C., whereupon it decomposed with evolution of ammonia, and was then heated to 140° C. for 1 hour, to yield 0.63 g of a resinous polymeric substance in accordance with the invention.

EXAMPLE 9

400 ml of acetaldehyde was added to 200 ml refrigerated ethanol in 1 liter Parr pressure reactor, the reactor closed up, and the stirrer started and water-cooling applied. 150 ml of anhydrous ammonia was added in 10 ml aliquots. The cooling coil was then drained and the reactor heated to 140° C., with monitoring of pressure and temperature. After cooling, the pressure was noted and the product was stripped on a rotary vacuum evaporator under vacuum (35° C., 20-25 mm Hg), to obtain 220 g of a resinous polymeric substance in accordance with the invention.

EXAMPLE 10

The procedure of Example 9 was repeated using 120 ml of anhydrous ammonia. 237 g of a resinous polymeric substance according to the invention was obtained.

EXAMPLE 11

The procedure of Example 9 was repeated, using 90 ml of anhydrous ammonia. 258 g of a resinous polymeric substance in accordance with the invention was obtained.

EXAMPLE 12

The procedure of Example 10 was repeated except that the ammonia was first added to the ethanol in the reactor with cooling under pressure, after which the acetaldehyde was metered into the reactor with a metering pump with cooling. 233 g of a resinous polymeric substance in accordance with the invention was obtained.

EXAMPLE 13

The procedure of Example 10 was repeated, except that the ammonia was added in 20 ml aliquots without simultaneous cooling. Instead, after each aliquot of ammonia had been added, temperature increase against time was noted, after which cooling was applied prior to addition of the succeeding aliquot. Thereafter the reactor thermostat was set successively to 50° C., 100° C., 130° C. and 140° C. After autoclaving, cooling and stripping according to the procedure of Example 10, 250 g of a resinous polymeric cubstance in accordance with the invention was obtained.

EXAMPLE 14

The procedure of Example 11 was repeated, except that the ammonia was added in 30 ml aliquots with no cooling to test the controllability of the reaction without cooling. 254 g of a resinous polymeric substance in accordance with the invention was obtained.

EXAMPLE 15

The procedure of Example 9 was followed, except that 200 ml of n-butyraldehyde was used with 100 ml of ethanol solvent and 60 ml of anhydrous ammonia. A two-phase product was obtained, and the upper organic phase was separated and then stripped as in Example 9. 108 g of a resinous polymeric substance in accordance with the invention was obtained.

EXAMPLE 16

The procedure of Example 9 was followed, using 400 ml of distilled furfural, 200 ml of ethanol as solvent and 40 ml of anhydrous ammonia. 221 g of a resinous polymeric substance in accordance with the invention was obtained.

EXAMPLE 17

The procedure of Example 9 was followed, using 525 ml of acetone, 200 ml of ethanol as solvent and 90 ml of anhydrous ammonia. A relatively fluid resinous polymeric substance in accordance with the invention was obtained, the yield being 100 g.

EXAMPLE 18

The procedure of Example 9 was followed, using 449 ml of methyl-isobutylketone together with 100 ml of ethanol as solvent and 45 ml of anhydrous ammonia. 6 g of a resinous polymeric substance in accordance with the invention was obtained.

EXAMPLE 19

The procedure of Example 9 was followed, using 445 ml of diacetone alcohol, 100 ml of ethanol as solvent and 45 ml of anhydrous ammonia. 99 g of a relatively fluid resinous polymeric substance in accordance with the invention was obtained.

When the above laboratory scale examples had been completed, two larger scale tests were carried out. These tests are described in the following examples.

EXAMPLE 20

26 l of acetaldehyde was reacted with 13 l of 95% ethanol and 6 kg of anhydrous ammonia. The reaction was done in a pressure vessel having a working volume of 90 l. The pressure vessel was connected to a heat exchanger via a circulating pump, the heat exchanger being arranged for connection to a supply of cooling water and to steam at 100 psi. Provision was made for monitoring the temperature and pressure in the pressure vessel, and for charging the starting materials into the circuit, circulating the reaction mixture by means of the circulating pump through the heat exchanger and removing product from the circuit. The apparatus is described in more detail hereunder.

In preparing the trial batch of Example 20, first, 13 l of ethanol was pumped into the pressure vessel from a supply connected to the inlet of the circulating pump. Then, also from a supply and via the inlet of the circulating pump, 26 l of acetaldehyde was pumped into the vessel. The pump was then used to circulate the ethanol/acetaldehyde solution round the circuit and through the heat exchanger, and cooling water was fed to the heat exchanger. The temperature in the pressure vessel was maintained between 40° C. and 90° C. The ammonia was added incrementally. After the last increment of ammonia had been added, the temperature in the reactor was increased to 140° C. after which it was rapidly cooled to 50° C. Laboratory scale stripping was performed on the product obtained to yield 25.3 kg of a resinous polymeric substance in accordance with the invention.

EXAMPLE 21

The procedure of Example 20 was repeated, except that after addition of all the ammonia the reaction mixture was heated to a temperature of about 140° C. for an hour. Laboratory scale stripping of the product yielded 26.7 kg of a resinous polymeric substance in accordance with the invention.

EXAMPLE 22

Acetaldol was prepared from acetaldehyde by well-known procedures, and the product without purification was used as follows:

Acetaldol (400 g crude) was added to chilled ethanol (200 ml), and the mixture was reacted as in Example 9 with anhydrous ammonia (90 ml). After stripping, 316 g of a resinous polymeric substance in accordance with the invention was obtained.

EXAMPLE 23

Freshly distilled acetaldehyde (400 ml) was added to chilled ethanol (200 ml) in a 1 liter Parr pressure reactor fitted with gas sparger, cooling coil, agitator and an inlet line fed from a high pressure metering pump. Cooling water was passed through the coil, and sodium hydroxide solution (2%, 70 ml) was pumped in over 1½ hours to convert the acetaldehyde to acetaldol. The mixture was then reacted as in Example 9 with anhydrous ammonia (90 ml). After stripping, 274 g of a resinous polymeric substance in accordance with the invention was obtained.

EXAMPLE 24

Acetaldehyde (400 ml) was added to chilled ethanol (200 ml), and the mixture was reacted as in Example 9 with anhydrous ammonia (90 ml) and then autoclaved at 150° C. for 1½ hours. After cooling and stripping, 267 g of a resinous polymeric substance in accordance with the invention was obtained.

EXAMPLE 25

The procedure of Example 24 was repeated with autoclaving for two hours. 240 g of a resinous polymeric substance in accordance with the invention was obtained.

EXAMPLE 26

The procedure of Example 24 was repeated with autoclaving at 130° C. for 1½ hours. 279 g of a resinous polymeric substance in accordance with the invention was obtained.

EXAMPLE 27

The procedure of Example 26 was repeated with autoclaving for two hours. 282 g of a resinous polymeric substance in accordance with the invention was obtained.

EXAMPLE 28

The procedure of Example 15 was repeated using 30 ml of anhydrous ammonia, and autoclaving at 150° C. for 5½ hours. 136 g of a resinous polymeric substance in accordance with the invention was obtained.

EXAMPLE 29

The procedure of Example 9 was repeated using propionaldehyde in place of acetaldehyde, and 70 ml of anhydrous ammonia. 234 g of a resinous polymeric substance in accordance with the invention was obtained.

EXAMPLE 30

The procedure of Example 9 was repeated using acetaldehyde (225 ml), ethanol (110 ml), and methylamine (88 ml). 146 g of a resinous polymeric substance in accordance with the invention was obtained.

EXAMPLE 31

The procedure of Example 30 was repeated using propionaldehyde (337 ml) in place of acetaldehyde. 200 g of a resinous polymeric substance in accordance with the invention was obtained.

EXAMPLE 32

The procedure of Example 30 was repeated using ethylamine (120 ml) in place of methylamine. 170 g of a resinous polymeric substance in accordance with the invention was obtained.

Various details of the tests conducted as described for some of Examples 1-32 above, are summarised in the following table, Table I.

TABLE I
SUMMARY OF REACTIONS

| Example Number | REAGENTS Carbonyl (ml) | Solvent (ml) | Amine (NH₃) (ml) | ADDITION Temp (°C.) | ADDITION Time (min) | Cooling | HEATING Start Temp (°C.) | HEATING Start Pressure (psi) | HEATING Time (min) | AUTOCLAVE Temp (°C.) | AUTOCLAVE Pressure (psi) | AUTOCLAVE Time (hr) | Pressure After Cooling (psi) | Stripped Product (g) |
|---|---|---|---|---|---|---|---|---|---|---|---|---|---|---|
| 4 | 3-methoxy-butyraldehyde 300 | 300 | 54 | — | — | None | — | — | — | 140–150 | — | 2 | — | 170 |
| 5 | Acetaldehyde 400 | 200 | 60 | 15–75 | — | None | 75 | — | — | 140 | 82 | 1½ | — | 306 |
| 9 | Acetaldehyde 400 | 200 | 150 | 25–30 | 15 | Continuous | 30 | <0 | 50 | 140 | 250 | 1½ | 10 | 220 |
| 10 | Acetaldehyde 400 | 200 | 120 | 25–40 | 14 | Continuous | 25 | <0 | 55 | 140 | 190 | 1½ | 0 | 237 |
| 11 | Acetaldehyde 400 | 200 | 90 | 17–35 | 15 | Continuous | 26 | <0 | 35 | 140 | 130 | 1½ | <0 | 258 |
| 12 | Acetaldehyde 400 | 200 | 120 | 26–45 | — | Continuous | 28 | 15 | 40 | 140 | 180 | 1½ | — | 233 |
| 13 | Acetaldehyde 400 | 200 | 120 | 25–36 | 30 | Intermittent | 30 | <0 | 180 | 140 | 196 | 1½ | 0 | 250 |
| 14 | Acetaldehyde 400 | 200 | 90 | 23–77 | 40 | After addition | 23 | 2 | 45 | 140 | 160 | 1½ | 0 | 254 |
| 15 | Butyraldehyde 200 | 100 | 30 | 25–35 | 10 | Continuous | 32 | 7 | 40 | 140 | 170 | 1½ | — | 108 |
| 16 | Furfural 400 | 200 | 40 | 25–27 | 2 | Continuous | 26 | 30 | 40 | 140 | 120 | 1½ | 5 | 221 |
| 17 | Acetone 525 | 200 | 90 | 25 | 5 | Continuous | 25 | 38 | 60 | 140 | 320 | 1½ | 15 | 100 |
| 18 | Methylisoketone 449 | 100 | 45 | 25 | 0 | Continuous | 25 | 30 | 35 | 140 | 220 | 1½ | 22 | 6 |
| 19 | Diacetone Alcohol 445 | 100 | 45 | 25–27 | 3 | Continuous | 25 | 18 | 45 | 140 | 200 | 1½ | 12 | 99 |
| 20 | Acetaldehyde 26,0 l | 13 l | 6,0kg | 45–75 | 100 | Continuous | 72 | 0 | 30 | 137 | 154 | 0 | — | 25,3 kg |
| 21 | Acetaldehyde 26,0 l | 13 l | 6,0kg | 45–85 | 70 | Continuous | 83 | 0 | 30 | 135–147 | | 1 | — | 26,7 kg |

| Example Number | REAGENTS Carbonyl | EtOH (ml) | Amine (ml) | ADDITION Temp (°C.) | ADDITION Time (min) | Cooling | HEATING Start Temp (°C.) | HEATING Start Pressure (psi) | HEATING Time (min) | AUTOCLAVE Temp (°C.) | AUTOCLAVE Pressure (psi) | AUTOCLAVE Time (hr) | Pressure after cooling (psi) | Stripped product (g) |
|---|---|---|---|---|---|---|---|---|---|---|---|---|---|---|
| 22 | Unstripped Aldol 400 g | 200 | NH₃ 90 | 25–32 | 15 | Continuous | 32 | 0 | 35 | 140 | 105 | 1½ | 0 | 316 |
| 24 | Acetyaldehyde 400 ml | 200 | NH₃ 90 | 15–30 | 10 | Continuous | 25 | 0 | 45 | 150 | 118 | 1½ | 0 | 267 |
| 25 | Acetaldehyde 400 nl | 200 | NH₃ 90 | 12–27 | 7 | Continuous | 25 | 0 | 27 | 150 | 203 | 2 | 0 | 240 |
| 26 | Acetaldehyde 200 ml | 200 | NH₃ 90 | 10–30 | 9 | Continuous | 15 | 0 | 40 | 130 | 98 | 1½ | 0 | 279 |
| 27 | Acetaldehyde 400 ml | 200 | NH₃ 90 | 15–30 | 8 | Continuous | 20 | 0 | 43 | 130 | 100 | 2 | 0 | 282 |
| 28 | Butyraldehyde 200 ml | 100 | NH₃ 30 | 15–30 | 9 | Continuous | 15 | 0 | 55 | 150 | 170 | 5½ | 0 | 136 |
| 23 | /Aldol 400 ml | 200 | NH₃ 90 | 15–28 | 5 | Continuous | 28 | 23 | 47 | 140 | 132 | 1½ | 5 | 274 |
| 29 | Propionaldehyde 400 ml | 200 | NH₃ 70 | 25–37 | 5 | Continuous | 25 | 0 | 30 | 140 | 185 | 1½ | 0 | 234 |
| 30 | Acetaldehyde 225 ml | 110 | Methylamine 88 | 20–30 | 20 | Continuous | 29 | 5 | 40 | 140 | 108 | 1½ | 0 | 146 |
| 31 | Propionaldehyde 337 ml | 110 | Methylamine 88 | 20–30 | 13 | Continuous | 28 | 7 | 57 | 140 | 88 | 1½ | 0 | 200 |
| 32 | Acetaldehyde 225 ml | 110 | Ethylamine | | | Continuous | | | | | | | | |

With reference to Examples 20 and 21, FIG. 1 shows a schematic flow diagram of the circuit used. In FIG. 1, reference numeral 10 generally designates the reaction vessel, having a sight glass 12, temperature recorder 14 and pressure gauge 16. The reaction vessel is further provided with a safety valve 18 and vent 20. Reference numeral 22 shows a heat exchanger discharging into the vessel 10 by means of flow line 24. The heat exchanger 22 is shown provided with a steam supply line 26 and a water supply line 28, together with drain 30, steam release 32 and water outlet 34. A flow line 36 from the vessel 10 to the heat exchanger 22 is provided with a circulating pump 38. A product drain 40 is connected to the flow line 36 downstream of the pump 38. Ammonia feed line 42 from an ammonia supply is connected to the line 36 upstream of the pump 38; and acetaldehyde and ethanol feed lines 44, 46 are likewise connected to the line 36 upstream of the pump 38. An ammonia purge line 48 extends from the top of the vessel 10 to the ammonia feed line 42.

Figure 2:
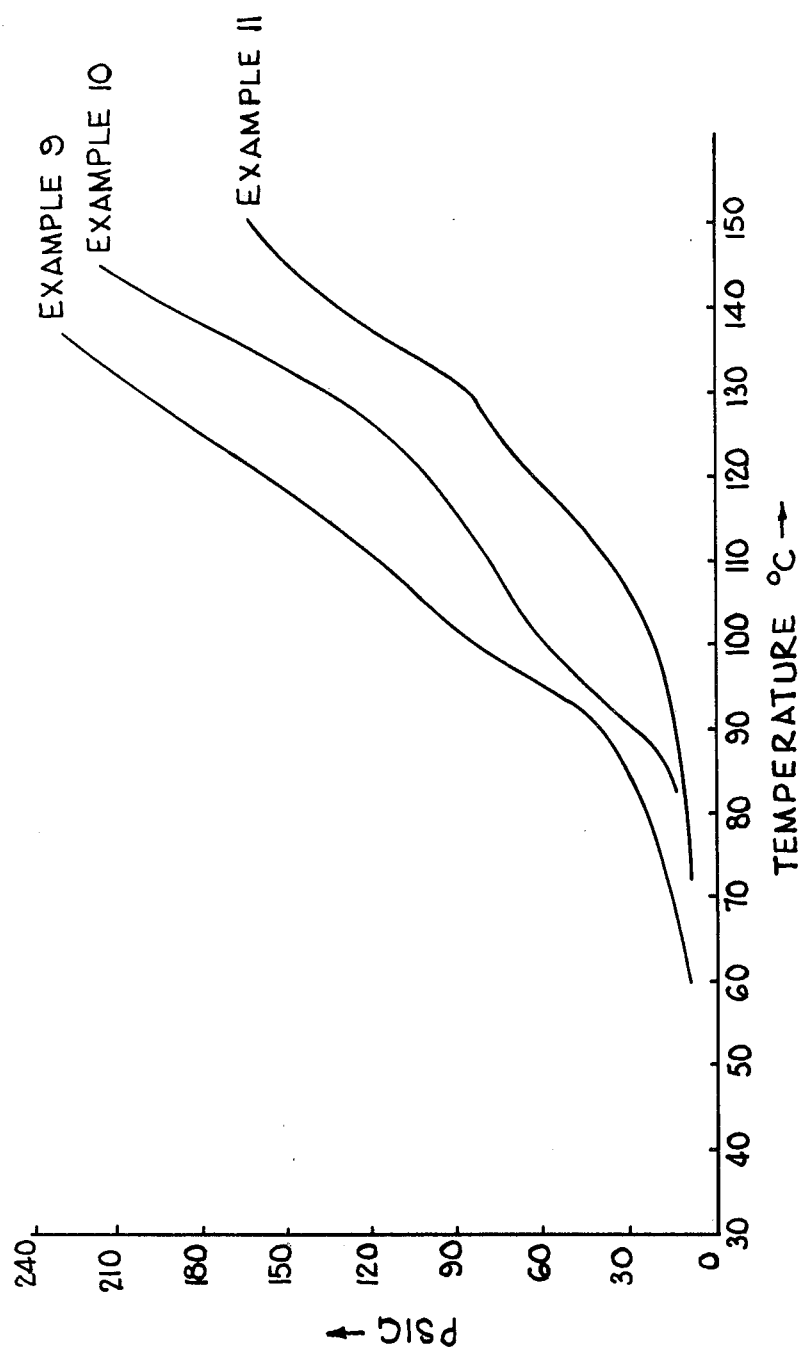
Figure 3:
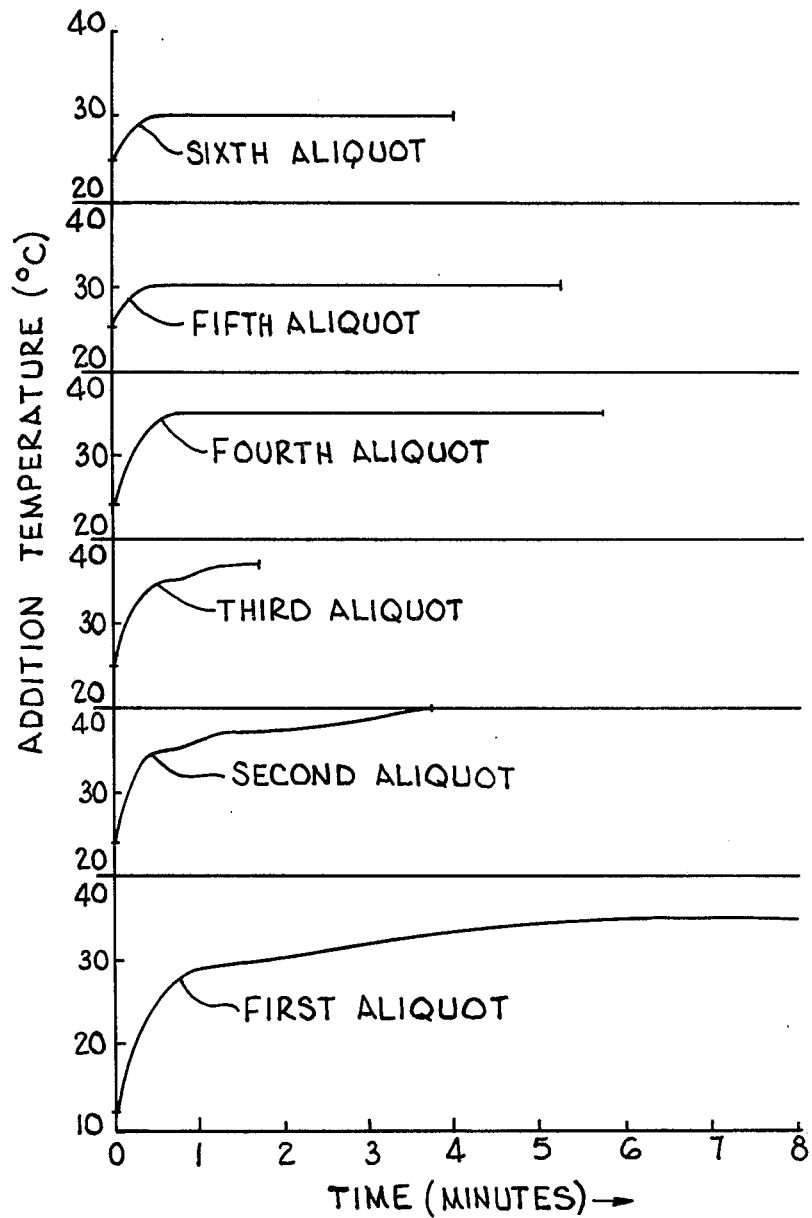
Figure 4:
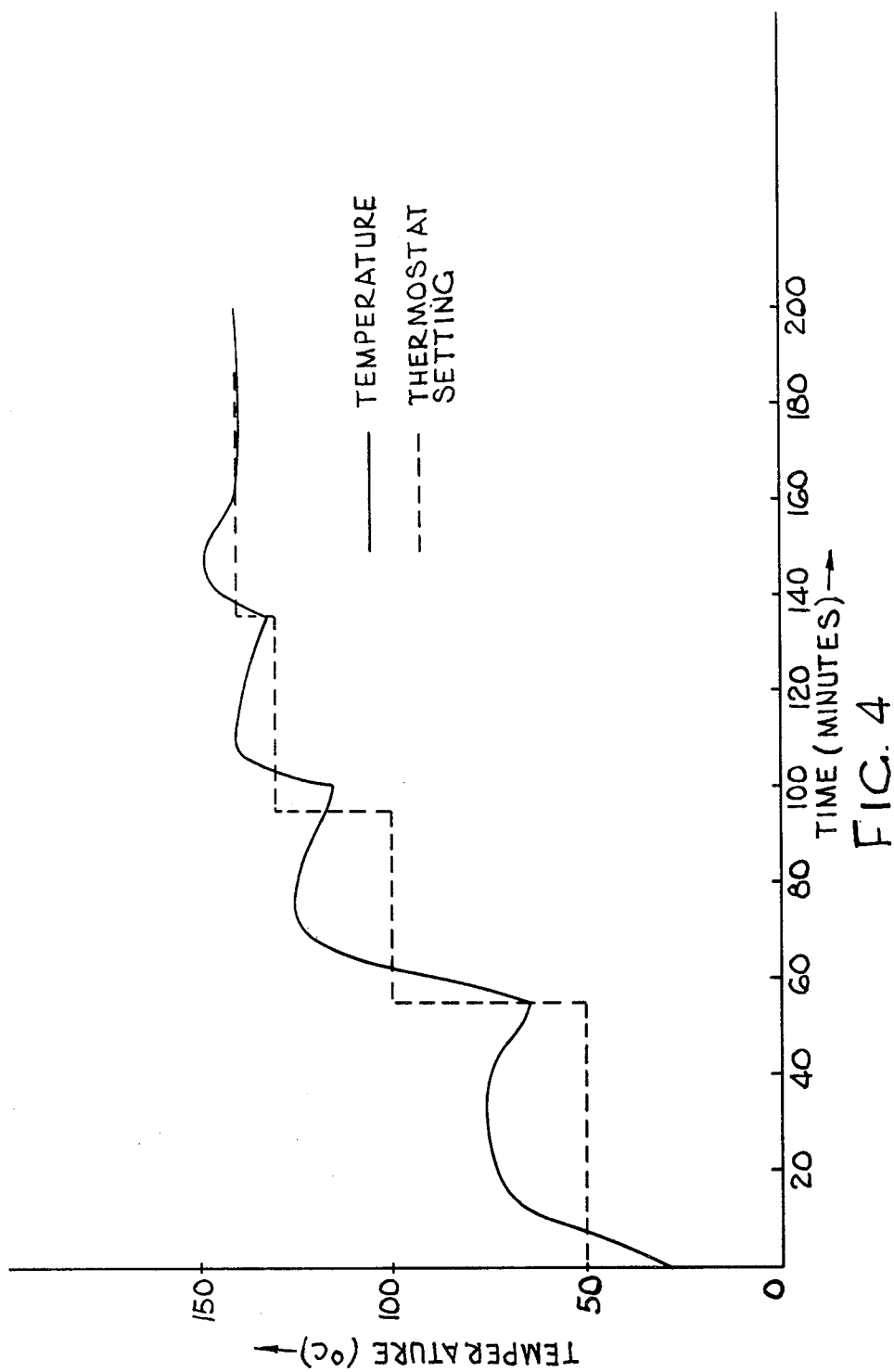
Figure 5:
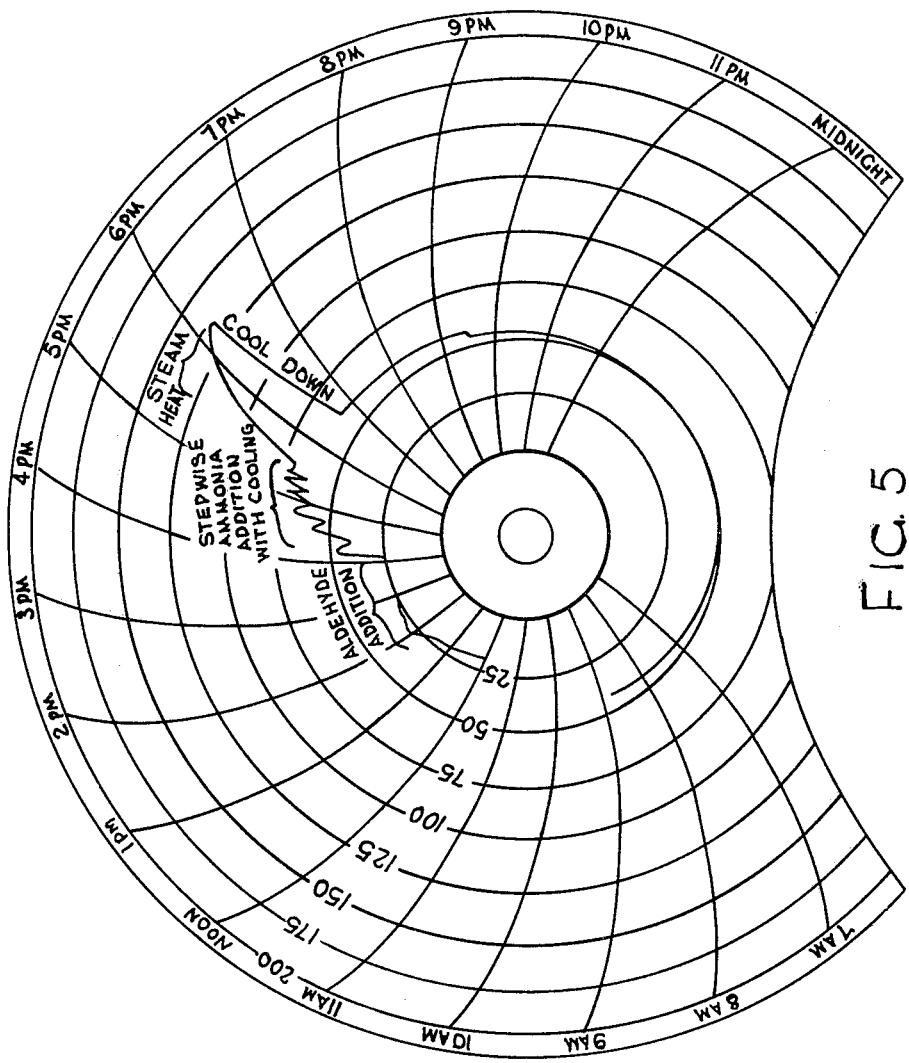
Figure 6:
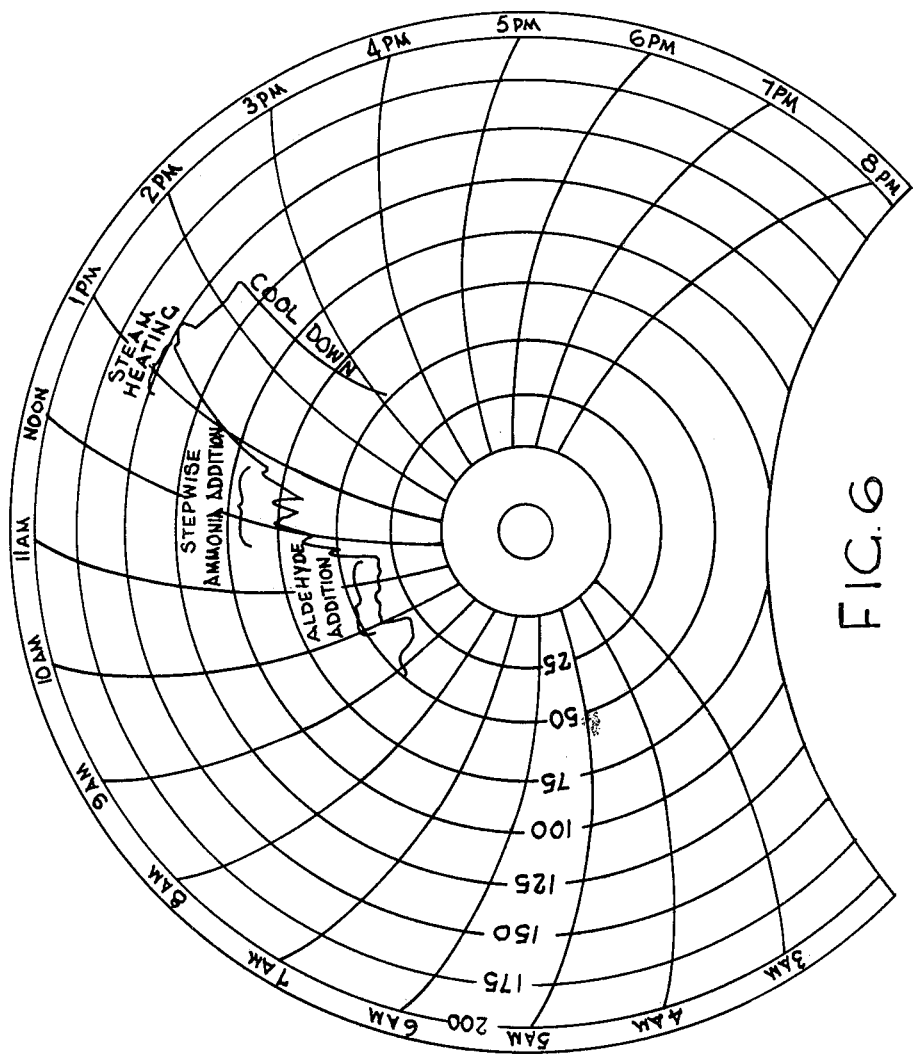

Pressure versus temperature data were recorded for Examples 9, 10 and 11 and are shown in FIG. 2; temperature versus time data for Example 13 are shown in FIGS. 3 and 4; and temperature versus time records for Examples 20 and 21 are shown in FIGS. 5 and 6.

Mean molecular weights of resinous polymeric substances in accordance with the invention produced by the methods described above were determined ebulliometrically, or by size-exclusion chromatography, and fell within the ranges specified above. Likewise elemental analyses were carried out. The results of the elemental analyses for some of the above Examples are set out in Table II hereunder, and the molecular weights obtained ebulliometrically are set out in Table III. Molecular weights obtained by size-exclusion chromatography are compared with those obtained ebulliometrically in Table IV, for some of the Examples.

By "aid" is meant a substance which, by itself or in conjunction with other aids, varies in a desired fashion the performance of a froth flotation circuit by, for example, increasing the percentage recovery and/or concentrate grade of the desired mineral, and/or improving the selectivity. The resinous polymeric substances in accordance with the invention may be used in the flotation of metal sulphides from their ores, e.g. copper sulphides and pyrite. The substances used in accordance with the invention may be used as collectors, and/or may be used to enhance the activity of the frother used in the circuit. The substances used in accordance with the invention may be used either alone, or in conjunction with other collector(s).

Thus, for example, the substances used in accordance with the invention may be used as collectors, alone or together with collectors containing thiol groups or their salts, e.g. xanthates, mercaptobenzothiazole, with compatible frothers such as the range of substituted 1, 3, 5-trioxanes available from the applicant under the proprietary name "SENFROTH ACCELERATOR" or triethoxybutene (TEB), which can be blended with the resinous polymeric substances without having an adverse effect on the frothing power of the frother or on

TABLE II

| Example No. | | 5 | 9 | 10 | 11 | 12 | 14 | 15 | 16 | 20 | 21 | 21 (repeat) |
|---|---|---|---|---|---|---|---|---|---|---|---|---|
| | C | 64,73 | 63,25 | 65,00 | 64.46 | 64.09 | 66,55 | 77,24 | 64,31 | 58,92 | 65,48 | 65,20 |
| | H | 8,12 | 9,85 | 9,71 | 9,79 | 9,67 | 9,37 | 11,28 | 4,80 | 10,19 | 9,66 | 9,72 |
| | N | 8,82 | 14,22 | 13,00 | 11,35 | 12,90 | 10,51 | 7,53 | 9,47 | 13,54 | 11,86 | 11,86 |
| | O | 11,42 | 12,46 | 12,77 | 14,46 | 13,72 | 12,47 | 4,10 | 21,20 | 16,28 | 13,31 | 13,47 |
| TOTAL | | 93,09 | 99,58 | 100,48 | 100,05 | 100,38 | 98,90 | 100,15 | 99,78 | 98,93 | 100,31 | 100,25 |

TABLE III

| Example No. | 5 | 9 | 10 | 11 | 12 | 14 | 15 | 16 | 20 | 21 | 21 (repeat) |
|---|---|---|---|---|---|---|---|---|---|---|---|
| Molecular weight | 783 | 437 | 526 | 615 | 513 | 593 | 231 | 379 | 470 | 531 | 453 |

TABLE IV

| Example No. | SEC Maximum MWt × $10^{-3}$ | Ebulliometric MWt × $10^{-3}$ |
|---|---|---|
| 5 | 0,6 | 0,78 |
| 9 | 2,0 | 0,44 |
| 10 | 2,0 | 0,53 |
| 11 | 2,3 | 0,61 |
| 12 | 1,4 | 0,51 |
| 13 | 2,0 | — |
| 14 | 1,2 | 0,59 |
| 15 | 3,4 | 0,23 |
| 16 | 0,6 | 0,38 |
| 20 | 1,7 | 0,47 |
| 21 | 1,4 | 0,51 1,45 |

Figure 7:
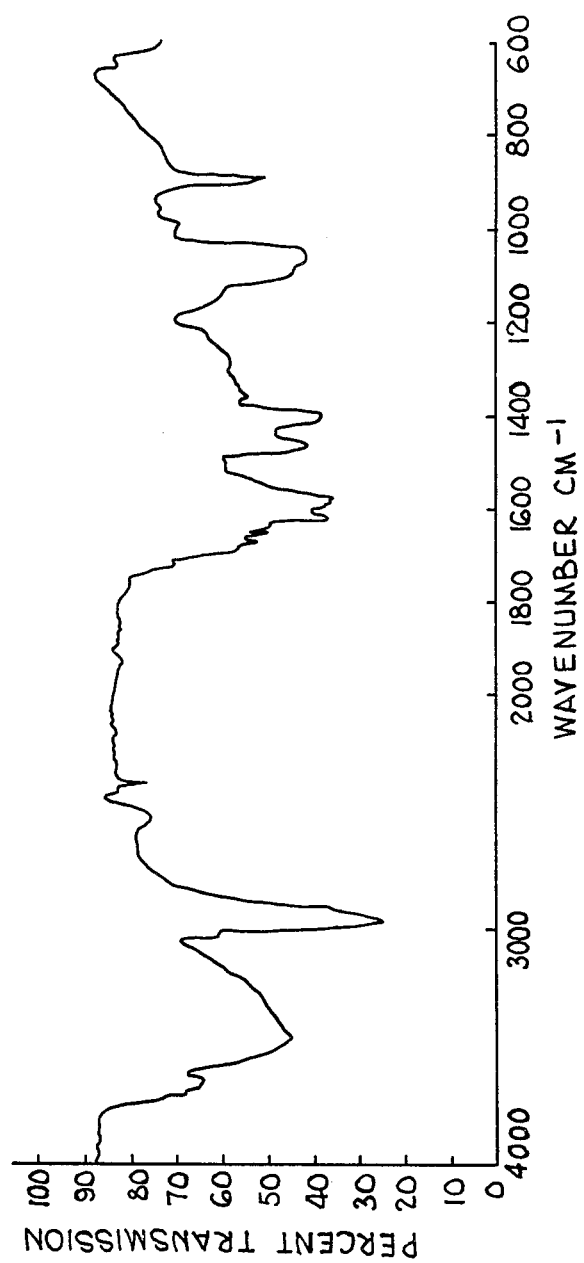
Figure 8:
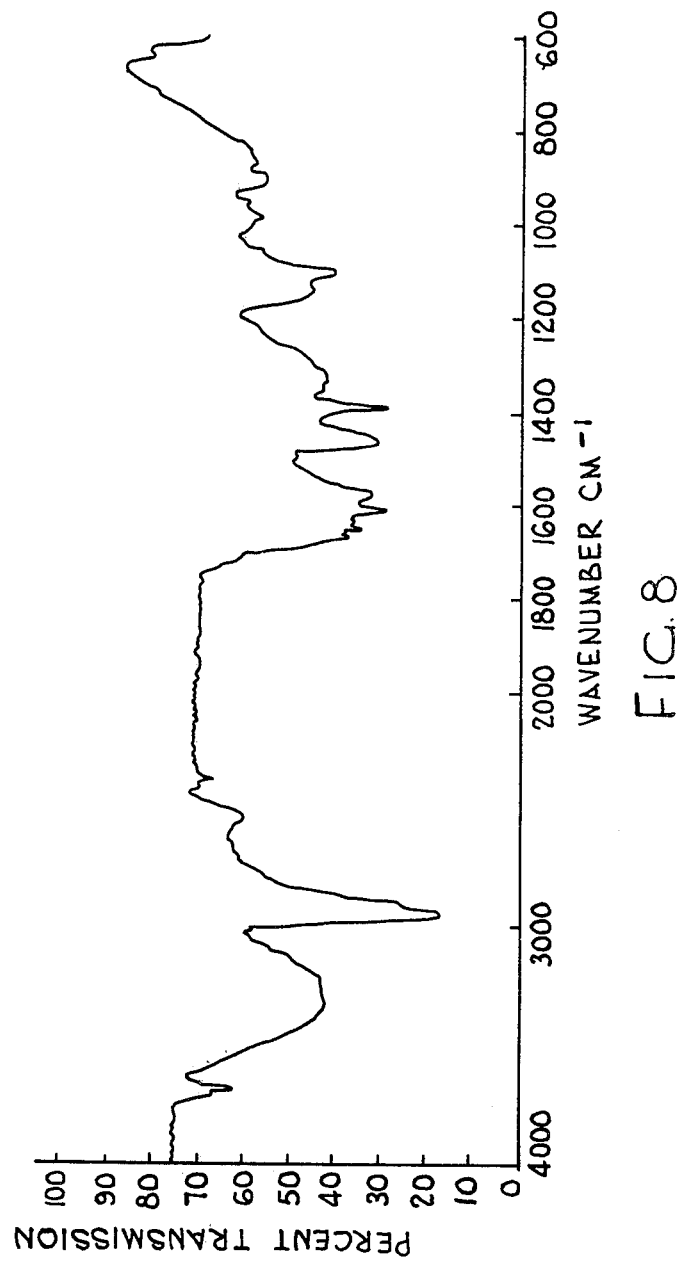
Figure 9:
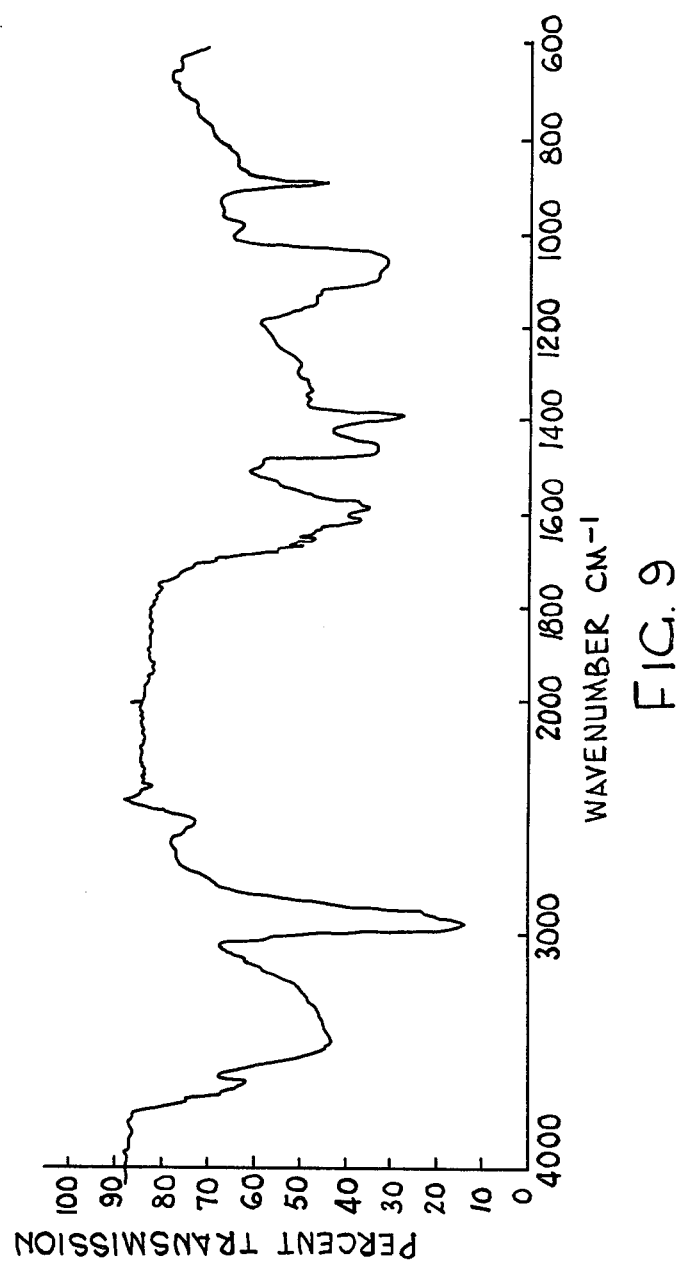

Infra-red spectra were obtained for the substances produced in Examples 11, 14 and 21 above. These spectra, run as 1% solutions in chloroform on a Beckman infra-red spectrophotometer are shown in FIGS. 7, 8 and 9.

The resinous polymeric substances in accordance with the invention were found generally to be useful in froth flotation.

Thus, in accordance with a yet further aspect of the invention there is provided a method of froth flotation which includes the step of using one or more selected resinous polymeric substances as described above, or a mixture thereof, as aids in froth flotation.

the efficacy of the resinous polymeric substances.

When used in the flotation of copper sulphides, particularly in conjunction with KAX (potassium amyl xanthate) and TEB, the substances in accordance with the invention may be added to the flotation circuit in quantities of up to about 100 g/tonne ore. The preferred range is in the region of about 10–50 g/tonne, more preferably about 15–45 g/tonne.

Flotion tests were carried out using substances in accordance with the invention by one or more of the following methods, depending on the ore used:

Method 1

A sample of copper sulphide ore containing mainly chalcopyrite, obtained from the North-Eastern Transvaal, was crushed, blended and screened to ≦1,5 mm. A 500 g portion of this sample was mixed with 500 ml of water, and reagent (where required), and ground in a laboratory rod mill until 80% of the ore charge was ≦75 μm. The pulp produced was diluted to 2,2 l with water in a 2,5 l stainless steel laboratory flotation cell. This was fitted to a Denver D-12 flotation machine which was equipped with an external air supply and flowmeter, and whose impeller speed was set to 1200 rpm. Further reagents were added (where required) and the pulp conditioned by agitation without aeration for a fixed time. Air was then admitted and controlled at 8,4 l/min. during the test. Froth was removed to the level of the cell lip with a paddle for 3 minutes. The whole concentrate and a sample of the tailings were filtered separately, oven dried, weighed, and analysed for copper by well known methods. The recovery of copper in the concentrate, and the apparent head grade were calculated.

Method 2

A sample of pyritic pulp from gold extraction on the West Rand area of the Transvaal was thoroughly mixed, and a portion calculated to contain 750 g dry ore taken. Each sample was diluted to 2,2 l with water and transferred to the flotation machine described in Method 1. The pH of the pulp was adjusted to 4,2 using 10% sulphuric acid, 4 ml of 1% copper sulphate solution added, and the pulp conditioned for 30 minutes with further correction of the pH as necessary. Reagents were then added and the pulp conditioned for a further 15 minutes. Air was then admitted and controlled at 9,0 l/min, and the concentrate removed as in Method 1. The whole concentrate and tailings were separately filtered, oven dried, weighed, and analysed for sulphur by combustion. The recovery of sulphur in the concentrate, and the apparent head grade were calculated.

Method 3

A sample of pyritic pulp similar to that employed in Method 2, but obtained from the East Rand area of the Transvaal, was thoroughly mixed and portions removed calculated to contain 500 g. Each sample was diluted to 2,2 l and transferred to the flotation machined described in Method 1. The pH of the pulp was adjusted to 4,2 using 10% sulphuric acid. Reagents were added and the pulp conditioned for 15 minutes. Air was admitted and controlled at 10,0 l/min, and the flotation test completed as in Method 2.

Method 4

A sample of a complex ore containing copper, zinc, lead and iron sulphides from the Northern Cape Province, was crushed, blended and screened to ≦1,5 mm. A 500 g portion of this was mixed with 500 ml water and ground in a laboratory rod mill until 70% of the charge was ≦75 μm. The pulp produced was diluted to 2,2 l and transferred to the flotation machine described in Method 1. Lime suspension was added to adjust the pH to 10,4, reagents were added, and the pulp conditioned for 5 minutes. Air was admitted and controlled to 9,0 l/min and the concentrate removed as in Method 1 for 6 minutes. The test was completed as in Method 1, except that both copper and iron were analysed.

EXAMPLE 33

The product of Example 13 was compared with potassium amyl xanthate (KAX) using Method 1. The product of Example 13 and the KAX were added to the mill before grinding respectively at a level of 40 g/tonne dry ore. A frother (TEB) was also added to the mill at 55 g/tonne in each test. These results were compared with the results of a control test using frother alone, and a test in which KAX was added to the flotation cell and conditioned for three minutes. All four tests used samples from the same ore batch, and results are set out on the following table, Table V.

TABLE V

| Collector | Level g/tone | Concentrate Grade % Cu | Recovery % | Mean Head grade 1,6% Cu |
|---|---|---|---|---|
| None | — | 14,1 | 65,1 | |
| KAX | 40 | 33,3 | 86,5 | |
| Product of Example 13 | 40 | 19,1 | 89,5 | Mean results of two tests |
| KAX (to cell) | 40 | 25,3 | 91,9 | |

The product of Example 13 was shown to increase both concentrate grade and recovery, i.e. to have collecting properties for copper sulphide minerals.

EXAMPLE 34

The product of Example 21 was compared according to the procedure of Example 33 with a control using frother alone.

Both tests were made on one batch of ore.

TABLE VI

| Collector | Level g/tonne | Concentrate Grade % Cu | Recovery % | Mean Head Grade 0,18% Cu |
|---|---|---|---|---|
| None | — | 1,84 | 21,5 | |
| Product of Example 21 | 40 | 5,71 | 62,4 | Mean results of two tests |

The product of Example 21 was shown to have collecting properties.

EXAMPLE 35

The products of Examples 11, 12, 16 and 21 were compared using Method 1. Each was added to the mill before grinding at 40 g/tonne, together with 55 g/tonne TEB. All tests were made on one batch of ore. A test on a sample of this ore batch using only KAX and TEB failed as the froth height was insufficient for any recovery.

TABLE VII

| Example according to which collector produced | Level g/tonne | Concentrate Grade % Cu | Recovery % | Mean Head Grade 1,25% Cu |
|---|---|---|---|---|
| Example 11 | 40 | 13,2 | 92,2 | |
| Example 12 | 40 | 16,6 | 82,9 | |
| Example 16 | 40 | 11,1 | 65,1 | |
| Example 21 | 40 | 17,8 | 87,2 | |

The products of Examples 11, 12, 16 and 21 were shown to greatly improve the recovery of copper from this ore.

EXAMPLE 36

The products of Examples 9, 10, 14, 28 and 21 were compared as in Example 35 except that 30 g/tonne of compound was used in each test.

TABLE VIII

| Example according to which collector produced | Concentrate Grade % Cu | Recovery % | Mean Head Grade 1,26% Cu |
|---|---|---|---|
| Example 9 | 15,45 | 89,3 | |
| Example 10 | 14,20 | 90,2 | |
| Example 14 | 22,77 | 87,2 | |
| Example 15 | 11,18 | 87,1 | |
| Example 28 | 13,99 | 84,6 | |

TABLE VIII-continued

| Example according to which collector produced | Concentrate Grade % Cu | Recovery % | Mean Head Grade 1,26% Cu |
|---|---|---|---|
| Example 21 | 12,92 | 89,8 | |

The products of Examples 9, 10, 14, 15 and 28 were shown to improve recovery as those in Example 35.

EXAMPLE 37

The products of examples 22, 23, 24, 25, 26 and 27 were compared using Method 1. KAX at 30 g/t and TEB at 45 g/t were added to the mill before grinding, and the products respectively at 30 g/t added to the flotation cell and conditioned for 3 minutes before flotation. A control test using KAX at 40 g/t added to the mill and 55 g/t of a frother sold by the applicant under the trade designation "SENFROTH 41G" added to the cell and conditioned as before was made. All tests were made on a single batch of ore.

TABLE IX

| Example according to which collector produced | Concentrate Grade % Cu | Recovery % | Mean Head Grade 1,75% Cu |
|---|---|---|---|
| Example 22 | 29,87 | 87,5 | |
| Example 23 | 27,66 | 89,2 | |
| Example 24 | 26,83 | 88,9 | |
| Example 25 | 26,98 | 88,5 | |
| Example 26 | 29,19 | 89,0 | |
| Example 27 | 27,68 | 88,0 | |
| 41G | 29,68 | 83,0 | |

The products of Examples 22 to 27 all yielded higher recoveries than the control, and in the cases of the products of Examples 22 and 26 this was achieved at no reduction in concentrate grade.

EXAMPLE 38

The products of Examples 23, 29, 30, 31, 32 and 21 were compared as in Example 37. The test on the product of Example 21 was repeated, and an additional test of the product of Example 32 was made at 60 g/t.

The tests were compared with a control using only KAX and TEB. All tests were on a single batch of ore.

TABLE X

| Example according to which collector produced | Level g/t | Concentrate Grade % Cu | Recovery % | Mean Head Grade 1,22% Cu |
|---|---|---|---|---|
| Example 23 | 30 | 30,80 | 84,9 | |
| Example 29 | 30 | 28,87 | 82,1 | |
| Example 30 | 30 | 33,16 | 82,0 | |
| Example 31 | 30 | 31,88 | 81,5 | |
| Example 32 | 30 | 33,88 | 83,1 | |
| Example 32 | 60 | 33,07 | 86,1 | |
| Example 21 | 30 | 24,31 | 86,1 | |
| Example 21 | 30 | 26,92 | 86,4 | |
| None | — | 31,90 | 75,1 | |

The products of all the examples set out in Table X were shown to improve recovery, and in the cases of the products of Examples 30, and 32, there was no simultaneous reduction in concentrate grade.

EXAMPLE 39

A group of four tests using Method 1 was made using 36 g/t TEB and a single batch of ore. In the first two tests, 20 and 40 g/t KAX respectively were added to the mill before grinding, and 20 g/t of the product of Example 21 added to the flotation cell and conditioned for 3 minutes. These tests were repeated using 40 g/t of the product of Example 21.

TABLE XI

| KAX g/t | Product of Example 21 g/t | Concentrate Grade % Cu | Recovery % | Mean Head Grade 1,67% Cu |
|---|---|---|---|---|
| 20 | 20 | 14,6 | 76,6 | |
| 40 | 20 | 16,1 | 82,4 | |
| 20 | 40 | 13,2 | 84,2 | |
| 40 | 40 | 16,8 | 87,4 | |

These tests show that the combination of KAX and the product of Example 21 yields both a high concentrate grade and high recovery of mineral.

EXAMPLE 40

The procedure of Example 39 was repeated using 45 g/t TEB, 30 and 40 g/t KAX, and 30 and 40 g/t of the product of Example 21.

TABLE XII

| KAX g/t | Product of Example 21 g/t | Concentrate Grade % Cu | Recovery % | Mean Head Grade 1,08% Cu |
|---|---|---|---|---|
| 30 | 30 | 21,70 | 85,4 | |
| 40 | 30 | 23,24 | 83,4 | |
| 30 | 40 | 21,51 | 84,0 | |
| 40 | 40 | 23,90 | 83,4 | |

As all these tests yielded good results with little difference between them, a combination of KAX and the product of Example 21 in which both are applied at 30–40 g/t is shown to be optimum for this ore.

EXAMPLE 41

The procedure of Example 40 was repeated using sodium isobutyl xanthate (SIBX) in place of KAX.

TABLE XIII

| SIBX g/t | Product of Example 21 g/t | Concentrate Grade % Cu | Recovery % | Mean Head Grade 0,78% Cu |
|---|---|---|---|---|
| 30 | 30 | 33,23 | 87,2 | |
| 40 | 30 | 34,02 | 88,5 | |
| 30 | 40 | 32,59 | 88,4 | |
| 40 | 40 | 35,03 | 88,1 | |

The same conclusion as in Example 40 is shown, i.e. the combination of SIBX and the product of Example 21 is also efficient on this ore.

EXAMPLE 42

The effect of the product of Example 21 was evaluated using Method 2. A proprietary collector sold under the trade designation "Senkol 50" (25 g/t), a proprietary frother sold by the applicant under the trade designation "SENFROTH R55" (54 g/t) and the product of Example 21 (5,4 g/t) were separately added to the flotation cell and conditioned. The test was duplicated and compared with a control test using only the Senkol 50 and R55. All tests were made on one batch of ore.

TABLE XIV

| Example according to which collector produced | Concentrate Grade % S | Recovery % | Mean Head Grade 1,61% S |
|---|---|---|---|
| None | 24,56 | 91,9 | |
| Example 21 | 33,93 | 94,2 | |
| Example 21 | 24,94 | 94,1 | |

An improvement in recovery of sulphur is demonstrated, at little or no reduction in grade.

EXAMPLE 43

The effect of the product of Example 21 was evaluated using Method 3. TEB frother (45 g/t) and Senkol 50 collector (40 g/t) were added to the flotation cell and conditioned in each test.

The effect of 0, 10, 20 and 30 g/t of the product of Example 21 added with the other reagents was tested. All tests were on one batch of ore.

TABLE XV

| Level of product of Example 21 g/t | Concentrate Grade % S | Recovery % | Mean Head Grade 0,78% S |
|---|---|---|---|
| 0 | 14,27 | 78,3 | |
| 10 | 16,17 | 82,2 | |
| 20 | 16,66 | 85,2 | |
| 30 | 17,07 | 84,2 | |

Improvements in both concentrate grade and recovery are demonstrated.

EXAMPLE 44

The effect of the product of Example 21 was evaluated using Method 4. Sodium normal-propyl xanthate collector (SNPX, 30 g/t) and a frother sold by the applicant under the trade designation R5004 (15 g/t) were added to the flotation cell and conditioned in each test. The effects of 10, 25 and 50 g/t of the product of the Example 21 added with the other reagents were compared with a duplicate control using only SNPX and R5004.

TABLE XVI

| Level of product of Example 21 g/t | Concentrate Grade | | Recovery | | Mean Head Grades: 1,21% Cu; 16,4% Fe. |
|---|---|---|---|---|---|
| | % Cu | % Fe | % Cu | % Fe | |
| 0 | 5,92 | 28,5 | 88,9 | 32,2 | |
| 0 | 6,28 | 30,9 | 89,2 | 34,0 | |
| 10 | 4,23 | 30,5 | 88,3 | 45,4 | |
| 25 | 4,79 | 30,0 | 89,4 | 40,6 | |
| 50 | 5,55 | 28,5 | 91,9 | 34,3 | |

Increased iron recoveries at 10 to 25 g/t of the product of Example 21 are demonstrated, and increased copper recovery at 50 g/t.

EXAMPLE 45

The effect of the product of Example 21 was evaluated by Method 1 on a sample from the same mine of an ore known to be difficult to treat by flotation. TEB (45 g/t) and KAX (30 g/t) were added to the mill before grinding, and the product of Example 21 (20 g/t) added to the flotation cell and conditioned. This test was compared with a control test using only TEB and KAX.

TABLE XVII

| Level of product of Example 21 g/t | Concentrate Grade % Cu | Recovery % | Mean Head Grade 2,40% Cu |
|---|---|---|---|
| 0 | 53,72 | 51,1 | |
| 20 | 46,18 | 63,3 | |

Comparison of the results with Example 39 show the expected poor recovery in this case which is substantially increased by the product of Example 21.

The flotation tests thus confirm that substances in accordance with the invention provide, when used as aids in froth flotation, an action resulting in improved recoveries often with no simultaneous decrease in grade. This applies particularly when substances in accordance with the invention are used in conjunction with KAX, and act to supplant part of the KAX used. It will however be appreciated that the optimal proportions of TEB, KAX and substances in accordance with the invention will vary depending on the ore in question, and a certain amount of experimentation for each particular ore will be required. Also, where the same or comparable metallurgical performance is obtained, without marked improvement thereof, substantial saving in economy can be achieved in total reagent costs.

Without being bound by theory, the applicant believes that the reaction pathway in accordance with the abovedescribed method of making the resinous polymeric substances in accordance with the invention, includes reactions as set out hereunder. In discussing the reactions, reference will be made to the following table, Table XVIII. In Table XVIII, for various of the Examples described above certain comparisons are made on the basis of molar proportions and partial material balances. Thus in column 1 the moles of carbonyl (RCHO) and amine ($NH_3$) used in the starting material are compared with the moles of RCHO and $NH_3$ in the resinous polymeric material produced. In column 2 the percentage recovery of carbon (C) is compared with the percentage recovery of nitrogen (N); and in column 3 the ratio between RCHO and N as starting materials is contrasted with this ratio in the product substance.

TABLE XVIII

| Example No. | 1 MOLES IN | | MOLES OUT | | 2 Recovery % | | 3 RCHO: (N) | |
|---|---|---|---|---|---|---|---|---|
| | RCHO | $NH_3$ | RCHO | $NH_3$ | (C) | (N) | IN | OUT |
| 5 | 7,06 | 2,15 | 8,25 | 1,93 | 117 | 90 | 3,28 | 4,28 |
| 9 | 7,06 | 5,37 | 5,79 | 2,23 | 82 | 42 | 1,31 | 2,59 |
| 10 | 7,06 | 4,30 | 6,41 | 2,20 | 91 | 51 | 1,64 | 2,91 |
| 11 | 7,06 | 3,22 | 6,92 | 2,09 | 98 | 65 | 2,19 | 3,31 |
| 12 | 7,06 | 4,30 | 6,22 | 2,15 | 88 | 50 | 1,64 | 2,90 |
| 14 | 7,06 | 3,22 | 7,04 | 1,91 | 100 | 59 | 2,19 | 3,69 |
| 15 | 2,27 | 1,07 | 1,73 | 0,58 | 76 | 54 | 2,12 | 2,99 |
| 16 | 4,82 | 1,43 | 2,37 | 1,49 | 49 | 104 | 3,37 | 1,58 |
| 21 | 750 | 351 | 621 | 244 | >83 | >70 | 2,14 | 2,54 |
| 22 | 750 | 351 | 725 | 226 | 97 | 64 | 2,14 | 3,21 |

The reaction of excess furfural as carbonyl starting material with ammonia as starting material (Example 16) gives high nitrogen recovery as seen from Table IX, in contrast with the cases where aliphatic aldehydes are used as carbonyl starting materials. Analysis shows that the mean molecule contains four furfural groups and 2½ nitrogen atoms, giving an overall stoichiometry of 4 RCHO + 2½ $NH_3 \rightarrow$ resinous polymeric substance + 3-$H_2O$. Under the reaction conditions, it is believed that reaction should only involve the aldehyde group and no disproportionation should occur. Hence products should be chains or rings of alternating carbon and hetero atoms. Chains require three hetero atoms for every four aldehyde groups, and rings four hetero atoms for every four aldehyde groups. The ratio obtained with furfural is about 3½ hetero atoms for every four aldehyde groups, i.e. the product appears to be a mixture of unbranched open chain and ring structures, assuming that geminalamino alcohol and geminal diamine terminating groups would be unstable, as appears to be likely. The most likely chain termination, assuming these restrictions, is R—CH=N—CH(R)— and the simplest example is the imino diamine. The fact that cyclic structures, e.g. hexahydrotriazines, are unstable towards the imino diamines on heating suggests that the primary products here are open chain, and these react with the water produced on cooling, yielding some cyclic, oxygen-containing components. Possible structures (V) and (VI) are as follows:

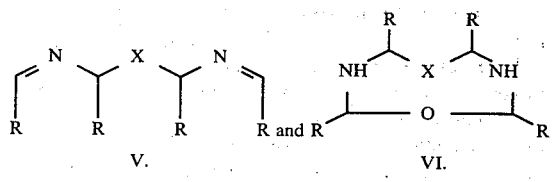

where X can be NH or O.

The course of reaction with aliphatic aldehyde starting materials, e.g. acetaldehyde, in Examples 9 to 12 and 14, appears to be different. Substantially less ammonia is incorporated into the resins, despite considerable excess of aldehyde. In view of the high ammonia recovery in Example 16, it appears that at the end of the reaction in these Examples most of the original aldehyde groups have reacted to a product unreactive towards ammonia. This condensation apparently occurs in the range 50°–100° C., thereby reducing the free aldehyde and pressure. As imino diamines disproportionate at and above this temperature range to N-vinylimines (A T Nielsen et al; J. Org. Chem. 38 (19) 3288–3294 (1973 and R. H. Hasek, Elam & Martin; J. Org. Chem. 26 1822–1825 (1961)), which are highly reactive compounds, it thus appears that the second stage of the reaction (after initial reaction of the aldehyde with ammonia to produce the compound VII at a relatively low temperature according to the reaction

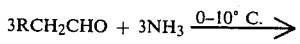

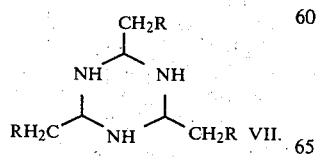

is the formation of the imino diamine (VIII) according to the reaction

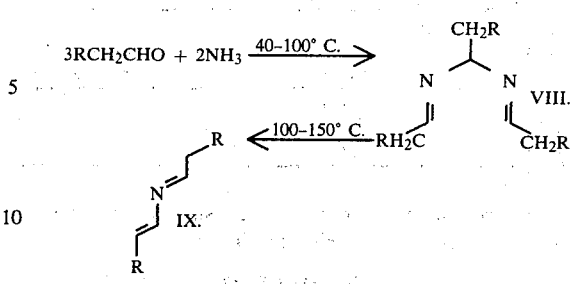

On further heating the next stage of the reaction yields the N-vinylimine (IX) (R=H) which would appear immediately to condense with the excess aldehyde and polymerize to approximately the degree of the final product. It appears possible that the initial condensation product (X) is:

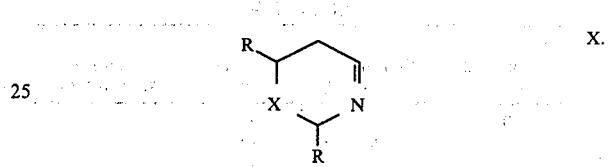

which, if the cyclic system is unstable, would be expected to yield compounds XI or XII.

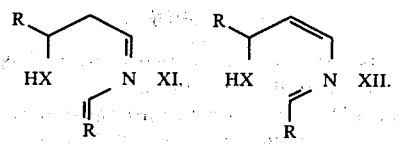

and these products may polymerize as follows:

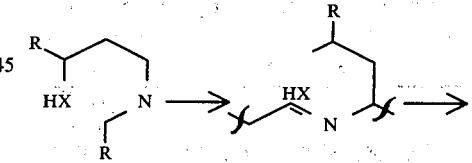

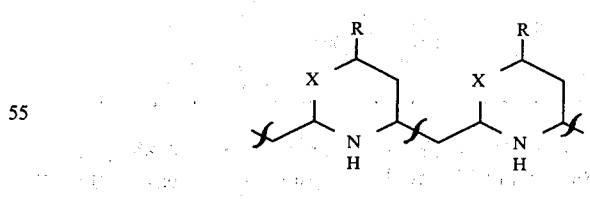

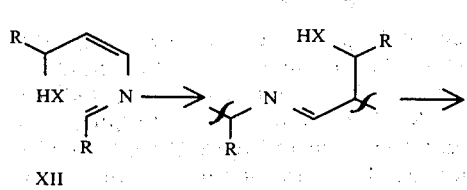

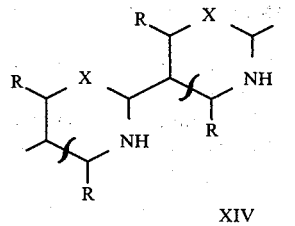

XIV

The cyclic structures believed possibly to be final products, i.e. formulae XIII and XIV may not be stable while autoclaving, but could possibly form on cooling. At the end of the reaction it is possible that more water would be present than ammonia, to explain the difference in nitrogen observed between Examples 20 and 21, if formula X (X=NH) contributes significantly to the initial uncyclized polymer, and if the X group is labile as in formula XII. Also, as the cyclizations are unlikely to be regular, —OH, —NH and imine groups should all be present, as is indicated by the IR spectra performed on the resins. These resinous polymeric structures all appear to have chains of 1,3-diamine structures, which are known strong ligands. On this basis, 4 to 7 units of formula X would appear to comprise the average molecule.

Also without being bound by theory, it appears possible that the activity of the resinous polymeric substances in accordance with the invention as aids in froth flotation may arise from zeta potential effects. Micro-electrophoresis experiments were conducted to measure zeta potential with a Zetameter on test suspensions made up of xanthated galena. Test suspensions were made up by the addition of 100 mg of xanthated galena, finely ground in an agate pestle and mortar, to 500 ml of $5 \times 10^{-3}$ M $NaClO_4$ solution containing the resinous polymeric substances in accordance with the invention being tested. The pH value was maintained at 9 with NaOH and the suspension was conditioned for 30 minutes before measurements were made. In the following tables, Tables XIX and XX zeta potential measurements are shown compared with controls, i.e. zeta potential measurements with the substances in accordance with the invention were compared with controls where the substances according to the invention were absent. In general it appears that inclusion of the resinous polymeric substances in accordance with the invention leads to a decrease in the negative zeta potential. It is believed that this decrease in negative zeta potential may contribute significantly to the usefulness of the resinous polymeric substances in accordance with the invention as aids in froth flotation, particularly when used in conjunction with xanthates.

TABLE XIX

| Example by which substance was produced. | Zeta pot. (mV) |
| --- | --- |
| Control | −40 |
| Example 4 | −5 |
| Example 5 | +5 |
| Example 6 | −5 |
| Example 7 | −22 |
| Example 8 | −28 |
| Example 9 | 0 to +VE |
| Example 10 | +20 |
| Example 11 | +26 |
| Example 12 | +21 |
| Example 13 | +22,5 |

TABLE XIX-continued

| Example by which substance was produced. | Zeta pot. (mV) |
| --- | --- |
| Example 14 | +40 |
| Example 15 | −16 |
| Example 16 | 0 |
| Example 17 | −28 |
| Example 20 | +ve to 0 |
| Example 21 | +25 |

TABLE XX

| Example by which substance was produced. | Zeta Potential (mV) |
| --- | --- |
| Control | −43 |
| Example 22 | +28 |
| Example 23 | +14 |
| Example 24 | +22 |
| Example 25 | +20,5 |
| Example 26 | +25,5 |
| Example 27 | +23,5 |
| Example 28 | −21,5 |

It is in connection with zeta potential effects that the importance of heating in the production of the resinous polymeric substances according to the invention arises. In the heating step the resinous polymeric substances are produced, which are substantially different in their physical and chemical properties from the products obtained from reacting the carbonyl compounds with the amines, prior to heating. By way of a comparison, the processes of Examples 6, 7 and 8 were repeated, but without the final heating. In each case the reaction product was isolated, and micro-electrophoresis experiments were conducted to measure zeta potential on xanthated galena, as described above. Thus, after heating, the zeta potentials obtained with the products of Examples 6, 7 and 8 were −5, −22, and −28 mV, the corresponding results for the products of Examples 6, 7 and 8 to which the heating had not been applied being −24, −31 and −40 mV. Furthermore, these products without the heating were found to have little or no efficacy as aids in froth flotation when compared with the substances according to the invention which had undergone heating in their production. The applicant has determined that the resinous polymeric substances of the invention start to be produced with heating at about 50° C. in significant quantities, and, as shown by gas evolution in Examples 9, 10 and 11, illustrated in FIG. 2 of the drawings. Commerically acceptable production is achieved at about 75° C., although higher temperatures are preferred. Autoclaving is desirable as the possibility of the emission of noxious gases is eliminated, and volatile starting materials and/or intermediates are not lost.

We claim:

1. A resinous polymeric substance for use as an aid in froth flotation characterized in that it:
    has a mean molecular weight as determined ebulliometrically or by size-exclusion chromatography in the range 250–10 000;
    includes carbon (C), hydrogen (H), nitrogen (N), and oxygen (O), and has an elemental analysis falling within the ranges:

| ELEMENT | % m/m (by mass) |
|---------|-----------------|
| C | 60–80 |
| H | 4–12 |
| N | 5–15 |
| O | 2–25 | has a viscosity falling within the range 10 000–100 000 centipoise (cps) at 20° C. and within the range 100–1 000 cps at 70° C.;

has an infra-red (IR) spectrum including broad weak band occurring in the wavenumber range 2600 cm$^{-1}$ to 2450 cm$^{-1}$ and a broad strong group of bands occurring in the wavenumber range 1700 cm$^{-1}$ to 1550 cm$^{-1}$.

2. A substance as claimed in claim 1, characterized in that it has a mean molecular weight falling within the range 250 to 2 500.

3. A substance as claimed in claim 2, characterized in that it has a mean molecular weight falling within the range 400 to 2 000.

4. A substance as claimed in claim 1, characterized in that it has an elemental analysis falling within the ranges:

| ELEMENT | % m/m |
|---------|-------|
| C | 60–70 |
| H | 8–10 |
| N | 8–14 |
| O | 10–17 |

5. A substance as claimed in claim 4, characterized in that it has an elemental analysis falling within the ranges:

| ELEMENT | % m/m |
|---------|-------|
| C | 62–67 |
| H | 9–10 |
| N | 11–13 |
| O | 12–14 |

6. A substance as claimed in claim 1, characterized in that it has an IR spectrum substantially similar to the IR spectra shown in FIGS. 7, 8 and 9 herein.

7. A substance as claimed in claim 1, characterized in that it is obtained by reacting one or more carbonyl compounds with one or more amines (including ammonia), followed by heating to a temperature above 50° C., each carbonyl compound having a single carbonyl group and the carbonyl starting material being mixed with the amine starting material followed by autoclaving the reaction mixture in a pressure reactor under pressure at said temperature above 50° C.

8. A method of making a resinous polymeric substance as claimed in claim 1, characterized in that it comprises reacting a carbonyl compound with an amine (defined to include ammonia) followed by heating to a temperature above 50° C., the carbonyl compound having a single carbonyl group and being mixed with the amine starting material, the reaction mixture being heated by autoclaving it under pressure in a pressure reactor to said temperature above 50° C.

9. A method as claimed in claim 8, characterized in that the amine (including ammonia) used as a starting material is in accordance with the formula RNH$_2$ in which R is hydrogen or a linear or branched chain, saturated or unsaturated alkyl group comprising from 1 to 18 carbon atoms inclusive.

10. A method as claimed in claim 9, characterized in that R is an alkyl group having from 1 to 4 carbon atoms inclusive.

11. A method as claimed in claim 8, characterized in that the carbonyl compound used as a starting material is an aldehyde.

12. A method as claimed in claim 11, in which the aldehyde is in accordance with any one or the formulae (I) to (IV):

(I) R$_1$CHO

WHERE R$_1$ is a linear or branched alkyl group having from 1 to 4 carbon atoms;

   (II)

where R$_2$ is H, CH$_3$—, CH$_3$CH$_2$—, CH$_3$CH$_2$CH$_2$— or (CH$_3$)$_2$CH—
and
R$_3$ is H, CH$_3$—, or CH$_3$CH$_2$—;

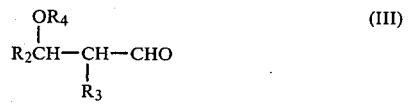   (III)

where R$_4$ is H, CH$_3$—, CH$_3$CH$_2$—, CH$_3$CH$_2$CH$_2$— or (CH$_3$)$_2$CH—
and R$_2$ and R$_3$ are as defined above; and

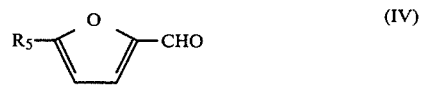   (IV)

where R$_5$ is H or —CH$_2$OH.

13. A method as claimed in claim 8, characterized in that ammonia is used as the amine starting material, the aldehyde starting material being selected from the group comprising acetaldehyde, butyraldehyde, 3-hydroxybutyraldehyde, acetaldol, crotonaldehyde, 3-ethoxybutyraldehyde, 3-methoxybutyraldehyde and furfural.

14. A method as claimed in claim 8, characterized in that the mixing takes place in the presence of a solvent wherein the starting materials are soluble.

15. A method as claimed in claim 12, characterized in that the reaction mixture after autoclaving is degassed or evaporated under vacuum to yield the product resinous polymeric substance.

16. A method as claimed in claim 8, characterized in that the degassing or evaporation is carried out at a pressure of between 15 mm Hg and 760 mm Hg, and at a temperature below 100° C.

17. A method as claimed in claim 8, characterized in that the mixing is carried out by stirring and/or pumping.

18. A method as claimed in claim 8, characterized in that the mixing is carried out with cooling.

19. A method as claimed in claim 8, characterized in that the mole ratio of carbonyl starting material to amine starting material is in the range 1:1 to 5:1.

20. A method as claimed in claim 8, characterized in that the autoclaving is carried out at a temperature in the range of 100° C. to 250° C. for a period of ¼ hour to 10 hours.

21. A method as claimed in claim 8, characterized in that the carbonyl compound is an aldehyde, and is mixed with ethanol as a solvent in the reactor, the amine starting material being anhydrous ammonia which is charged into the reactor, which reactor is stirred and cooled to maintain the temperature below 75° C., the mole ratio of aldehyde to ammonia being in the range 1,5:1 to 3:1, the reaction mixture, after addition of the ammonia, being autoclaved to a temperature in the range 120° C. to 180° C. for a period of ½ hour to 3 hours, followed by evaporation at a pressure between 30 mm Hg and 300 mm Hg at a temperature in the range 35° C. to 65° C.

22. A method as claimed in claim 20, characterized in that the aldehyde is added to the aqueous ammonia solution, with stirring at a temperature which is maintained in the range $-10°$ to 20° C., the mixture then being maintained within this temperature range for a period of between 1 and 15 days, after which the initial reaction product is isolated and is then heated to a temperature within the range 100° C. to 250° C. for a period in the range ¼ hour to 10 hours.

23. A method as claimed in claim 22, characterized in that the reaction mixture is maintained in the temperature range $-10°$ to 20° C. for a period of between 1 and 10 days, after which the initial reaction product is isolated by a method selected from the group consisting in crystallisation, extraction with a suitable solvent or evaporation under reduced pressure at a low temperature.

24. A method as claimed in claim 23, characterized in that the aldehyde is selected from the group consisting an acetaldehyde, butyraldehyde, 3-ethoxybutyraldehyde and 3-methoxybutyraldehyde, the amine being aqueous ammonia liquor and the temperature at which the aldehyde is added to the liquor being in the range $-5°$ C. to 5° C., the mixture being stirred at a temperature in the range 0° C.-5° C. for a period of 7 to 9 days, the initial reaction product, after isolation, being heated to a temperature in the range 120° C. to 180° C. for a period ½ hour to 3 hours.

25. A method of froth flotation characterized in that it comprises step of using a resinous polymeric substance as claimed in claim 1 inclusive as an aid in the froth flotation.

26. A method as claimed in claim 25, characterized in that the froth flotation is a process which involves the flotation of metal sulphides from the ores containing metal sulfides.

27. A method as claimed in claim 25, characterized in that the aid acts as a collector.

28. A method as claimed in claim 25, characterized in that the aid acts to enhance the activity of the frother used in the froth flotation process.

29. A method as claimed in claim 27, characterized in that the aid is used in a froth flotation process which employs an additional collector, other than the resinous polymeric substance.

30. A method as claimed in claim 29, characterized in that the additional collector is selected from the group of collectors containing thiol groups or their salts, and in that a compatible frother is used.

31. A method as claimed in claim 29, characterized in that copper sulphides are subjected to flotation, potassium amyl xanthate being used as the additional collector together with a compatible frother, the resinous polymeric substance being added to the flotation circuit in quantities of not more than a 100 g/tonne ore.

32. A method as claimed in claim 30, characterized in that the resinous polymer substance is added in a quantity of 10 to 50 g/tonne ore.

33. A method as claimed in claim 32, characterized in that the resinous polymeric substance is added in a quantity of 15 to 45 g/tonne ore.

34. A substance as claimed in claim 1, having been obtained by reacting one or more mono-aldehydes with one or more amines, defined to include ammonia, by adding said mono-aldehyde to a solution of said amine in water, isolating the reaction product so formed, and heating the isolated reaction product to a temperature above 50° C.

35. A method of making a resinous polymeric material as claimed in claim 1, which comprises reacting a monoaldehyde according to any one of formulae I, II or IV as defined in claim 12 with an amine, defined to include ammonia, by adding said aldehyde to an aqueous ammonia solution of said amine, isolating the reaction product so formed, and heating the isolated reaction product to a temperature of above 75° C.

* * * * *

UNITED STATES PATENT AND TRADEMARK OFFICE
CERTIFICATE OF CORRECTION

PATENT NO. : 4,330,667
DATED : May 18, 1982
INVENTOR(S) : JOB, John Leonard et al It is certified that error appears in the above—identified patent and that said Letters Patent is hereby corrected as shown below:

Column 12, line 22, replace "triethoxybutene" by --triethoxybutane--.

Signed and Sealed this

Fourteenth Day of September 1982

[SEAL]

Attest:

Attesting Officer

GERALD J. MOSSINGHOFF
Commissioner of Patents and Trademarks